(12) United States Patent
Lee et al.

(10) Patent No.: US 11,456,618 B2
(45) Date of Patent: Sep. 27, 2022

(54) MICRO-GRID SYSTEM WITH UN-INTERRUPTIBLE POWER SUPPLY

(71) Applicants: POSCO, Pohang-si (KR); RESEARCH INSTITUTE OF INDUSTRIAL SCIENCE & TECHNOLOGY, Pohang-si (KR)

(72) Inventors: Seung-Hee Lee, Pohang-si (KR); Im-Soo Mok, Gumi-si (KR); Jong-Heui Hong, Pohang-si (KR); Jin-Hee Lee, Pohang-si (KR); A-Rong Kim, Pohang-si (KR); Won-Joon Song, Pohang-si (KR)

(73) Assignees: POSCO, Pohang-si (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 0 days.

(21) Appl. No.: 17/297,975

(22) PCT Filed: Dec. 11, 2019

(86) PCT No.: PCT/KR2019/017513
§ 371 (c)(1),
(2) Date: May 27, 2021

(87) PCT Pub. No.: WO2020/122605
PCT Pub. Date: Jun. 18, 2020

(65) Prior Publication Data
US 2022/0094195 A1  Mar. 24, 2022

(30) Foreign Application Priority Data
Dec. 13, 2018 (KR) .......................... 10-2018-0160678

(51) Int. Cl.
*H02J 9/06* (2006.01)
*H02J 3/38* (2006.01)

(52) U.S. Cl.
CPC .............. *H02J 9/061* (2013.01); *H02J 3/381* (2013.01); *H02J 9/062* (2013.01); *H02J 2300/24* (2020.01)

(58) Field of Classification Search
CPC .. H02J 9/061; H02J 3/381; H02J 9/062; H02J 2300/24
See application file for complete search history.

(56) References Cited

U.S. PATENT DOCUMENTS 8,553,437 B2   10/2013  Berggren et al.
11,031,785 B1* 6/2021  Erokhovets ............... H02J 9/06
(Continued)

FOREIGN PATENT DOCUMENTS

JP  H07-067346 A   3/1995
JP  H11-89217 A    3/1999
(Continued)

OTHER PUBLICATIONS

International Search Report dated Apr. 10, 2020 issued in International Patent Application No. PCT/KR2019/017513 (with English translation).
(Continued)

*Primary Examiner* — Toan T Vu
(74) *Attorney, Agent, or Firm* — Morgan, Lewis & Bockius LLP

(57) ABSTRACT

A micro-grid system with a power supply is disclosed according to one embodiment of the present invention. The micro-grid system with a power supply, according to one embodiment of the present invention, comprises: a first node having AC power applied thereto from a bus system; a first generator for applying DC power to a second node; a first
(Continued)

load for receiving the AC power by being connected to a third node; a second load for receiving the DC power by being connected to the second node; a third load for receiving the AC power by being connected to a fourth node; a first converter for converting the DC power of the second node to AC power, and outputting same; a second converter for converting the DC power of the second node to AC power, and outputting same; and a switch unit for, according to the statuses of the first converter and the second converter, regulating the connection relations between the first node, the third node, the fourth node, the first converter and the second converter.

17 Claims, 7 Drawing Sheets

(56) References Cited

U.S. PATENT DOCUMENTS

| | | | |
|---|---|---|---|
| 2011/0144822 | A1 | 6/2011 | Choi |
| 2011/0148195 | A1 | 6/2011 | Lee |
| 2013/0035802 | A1* | 2/2013 | Khaitan .................. H02J 3/386 700/297 |
| 2016/0172862 | A1 | 6/2016 | Nishigai |
| 2017/0294782 | A1 | 10/2017 | Navarro |
| 2018/0019698 | A1 | 1/2018 | Kim et al. |

FOREIGN PATENT DOCUMENTS

| | | |
|---|---|---|
| JP | 2004-180467 A | 6/2004 |
| JP | 2015-177574 A | 10/2015 |
| KR | 10-2011-0034888 A | 4/2011 |
| KR | 10-2011-0068180 A | 6/2011 |
| KR | 10-2011-0072912 A | 6/2011 |
| KR | 10-1277185 B1 | 6/2013 |
| KR | 10-1409272 B1 | 6/2014 |
| KR | 10-2017-0031327 A | 3/2017 |
| KR | 10-2018-0009187 A | 1/2018 |
| KR | 10-1904821 B1 | 10/2018 |
| WO | 2015/015796 A1 | 2/2015 |

OTHER PUBLICATIONS

Japanese Office Action dated May 17, 2022 issued in Japanese Patent Application No. 2021-531610.

* cited by examiner

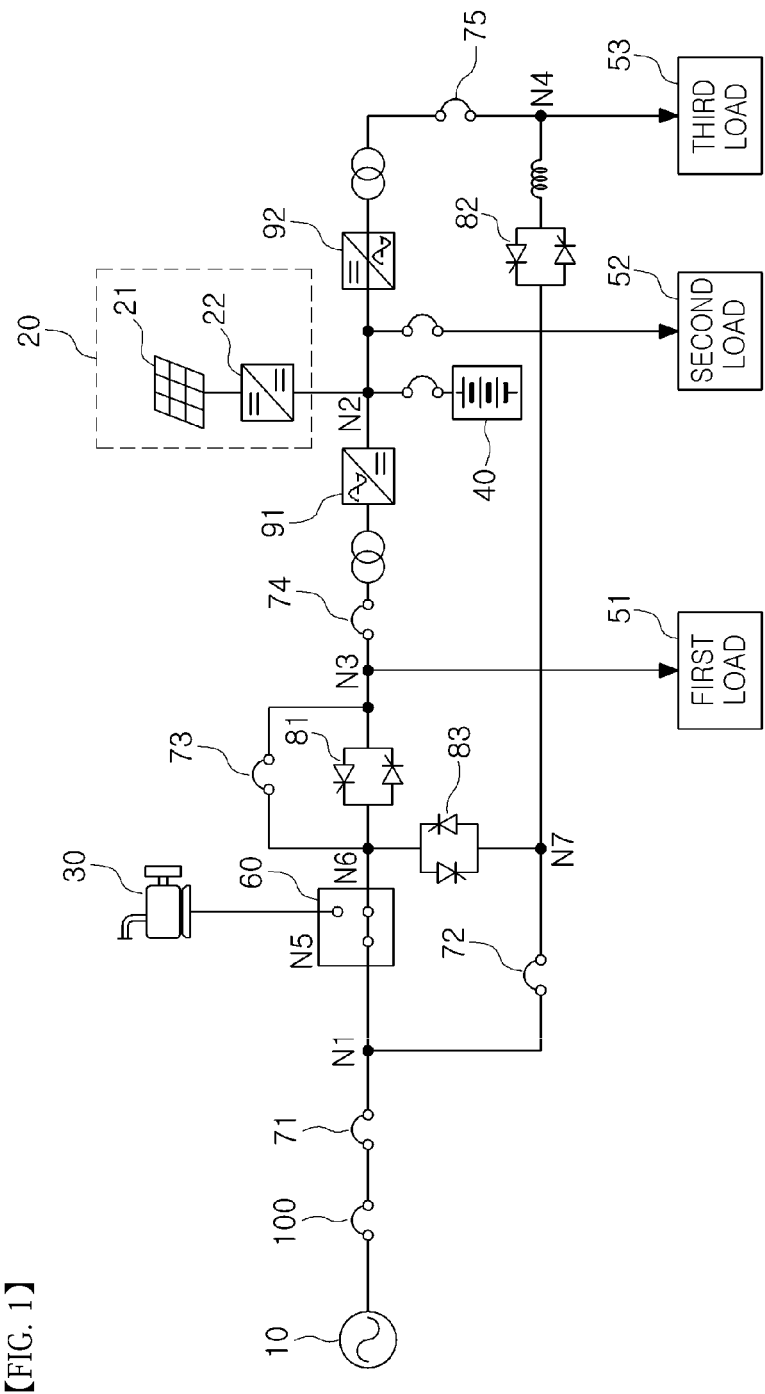
[FIG. 1]

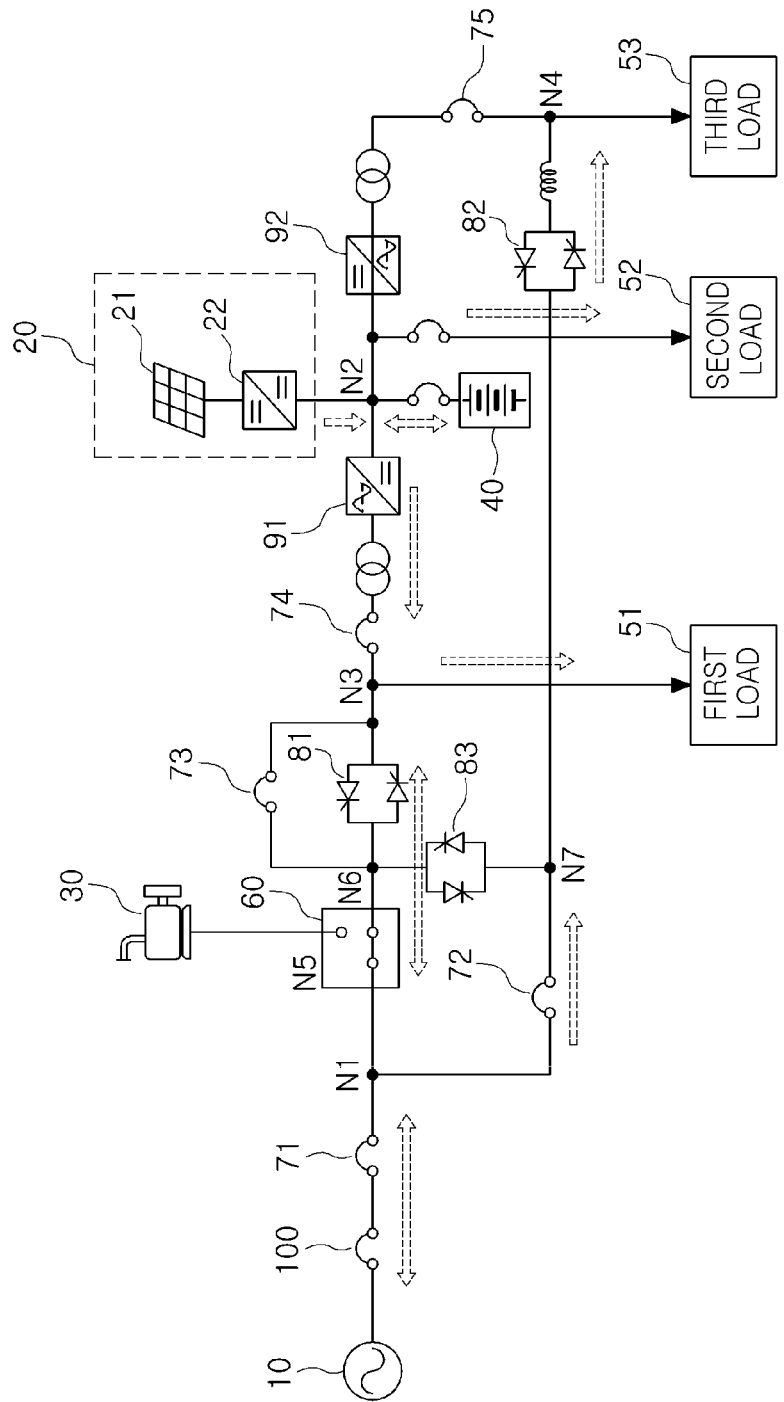
[FIG. 2]

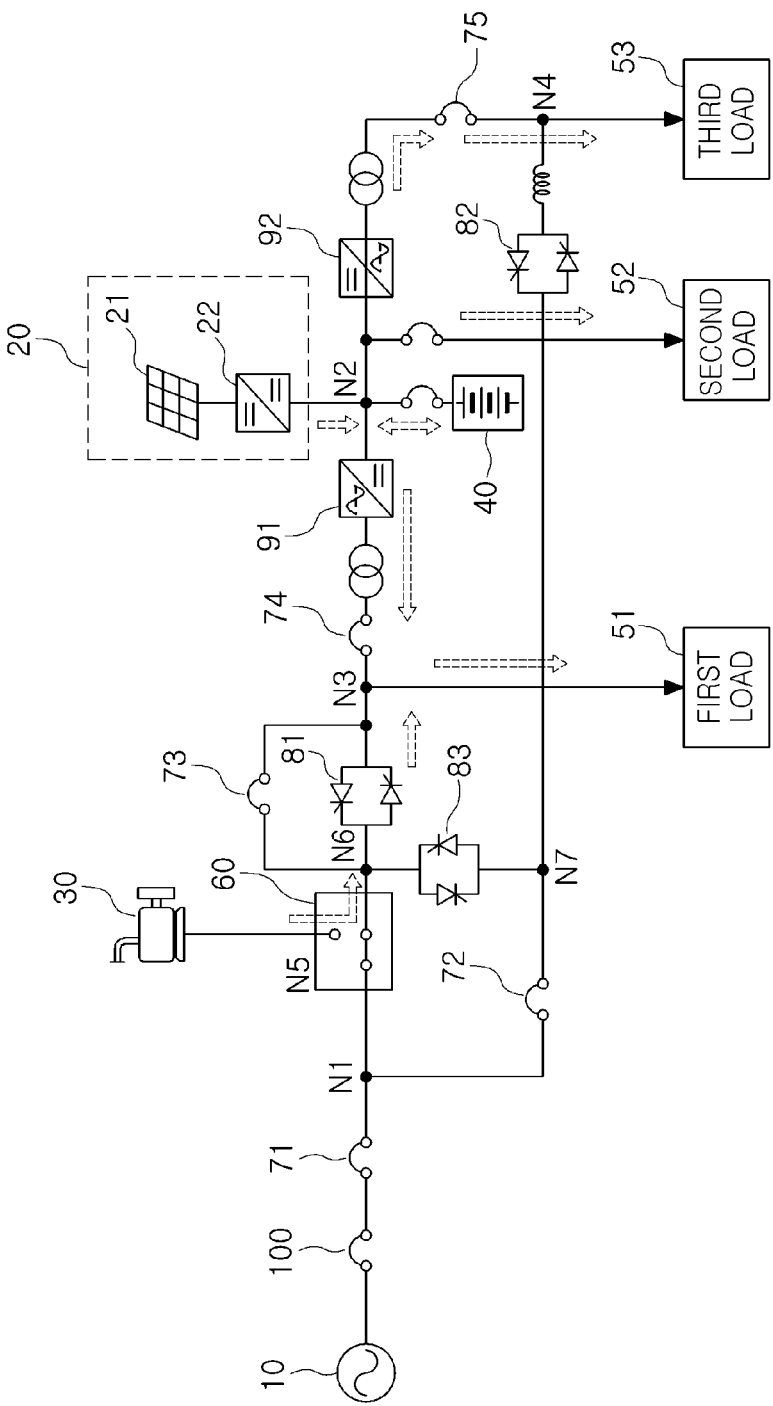
[FIG. 3]

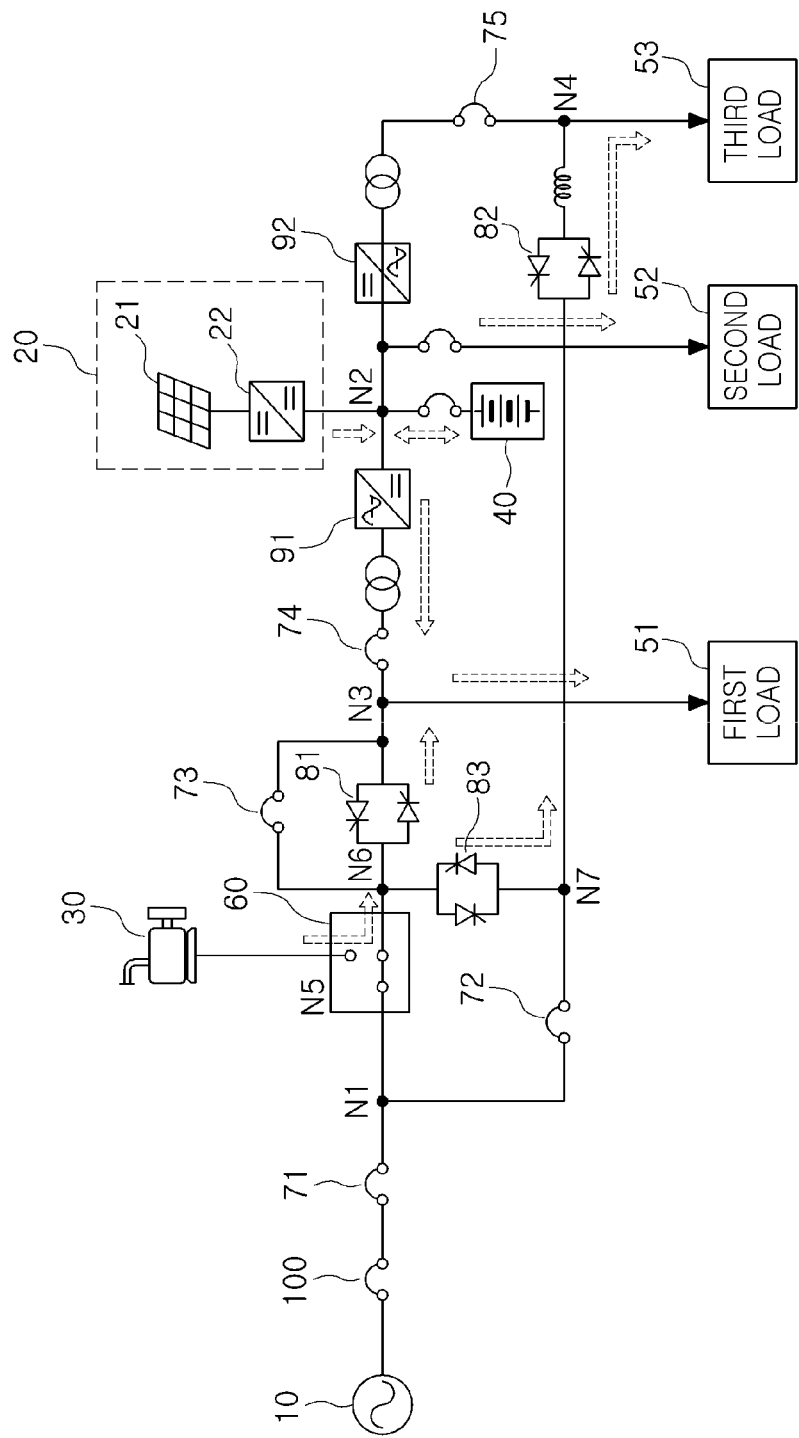
[FIG. 4]

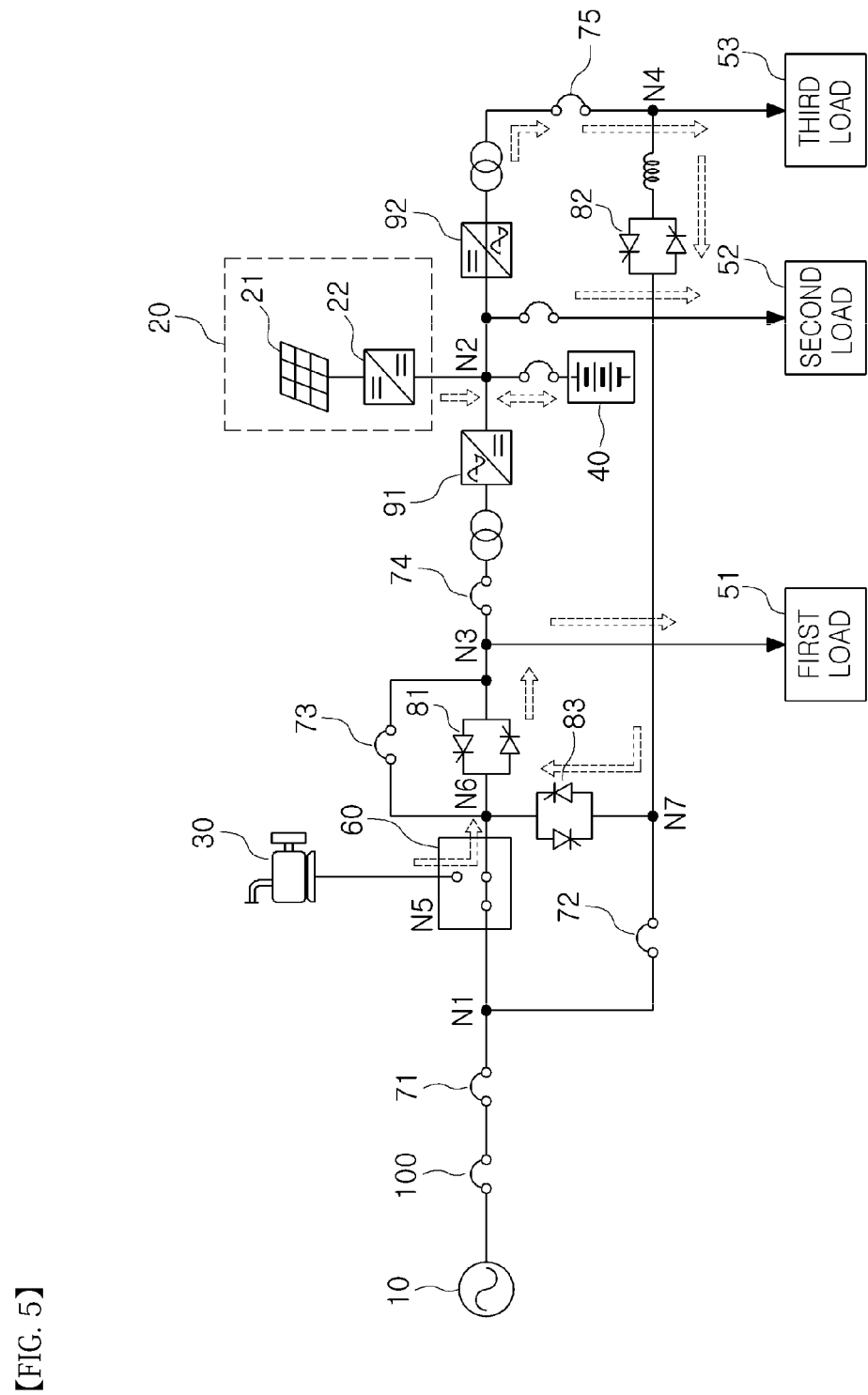
[FIG. 5]

[FIG. 6]
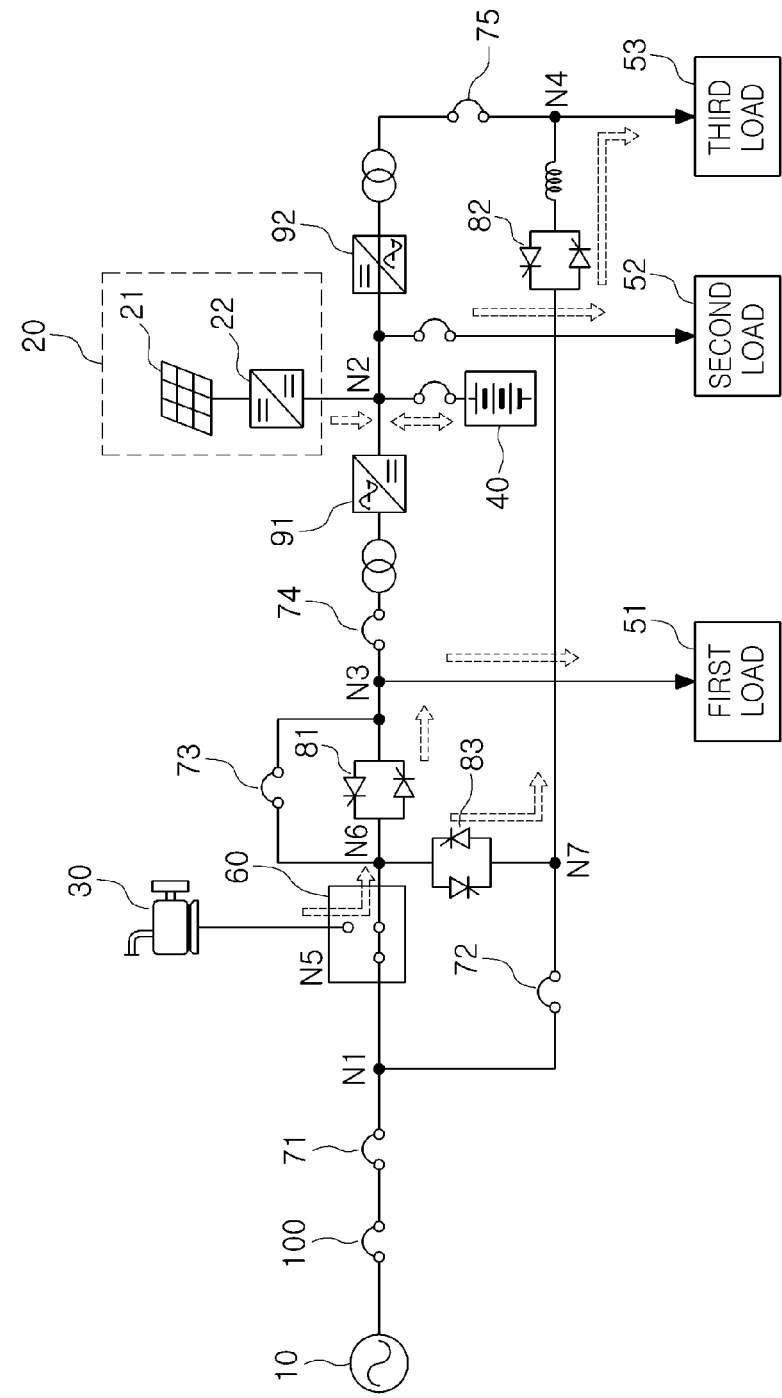

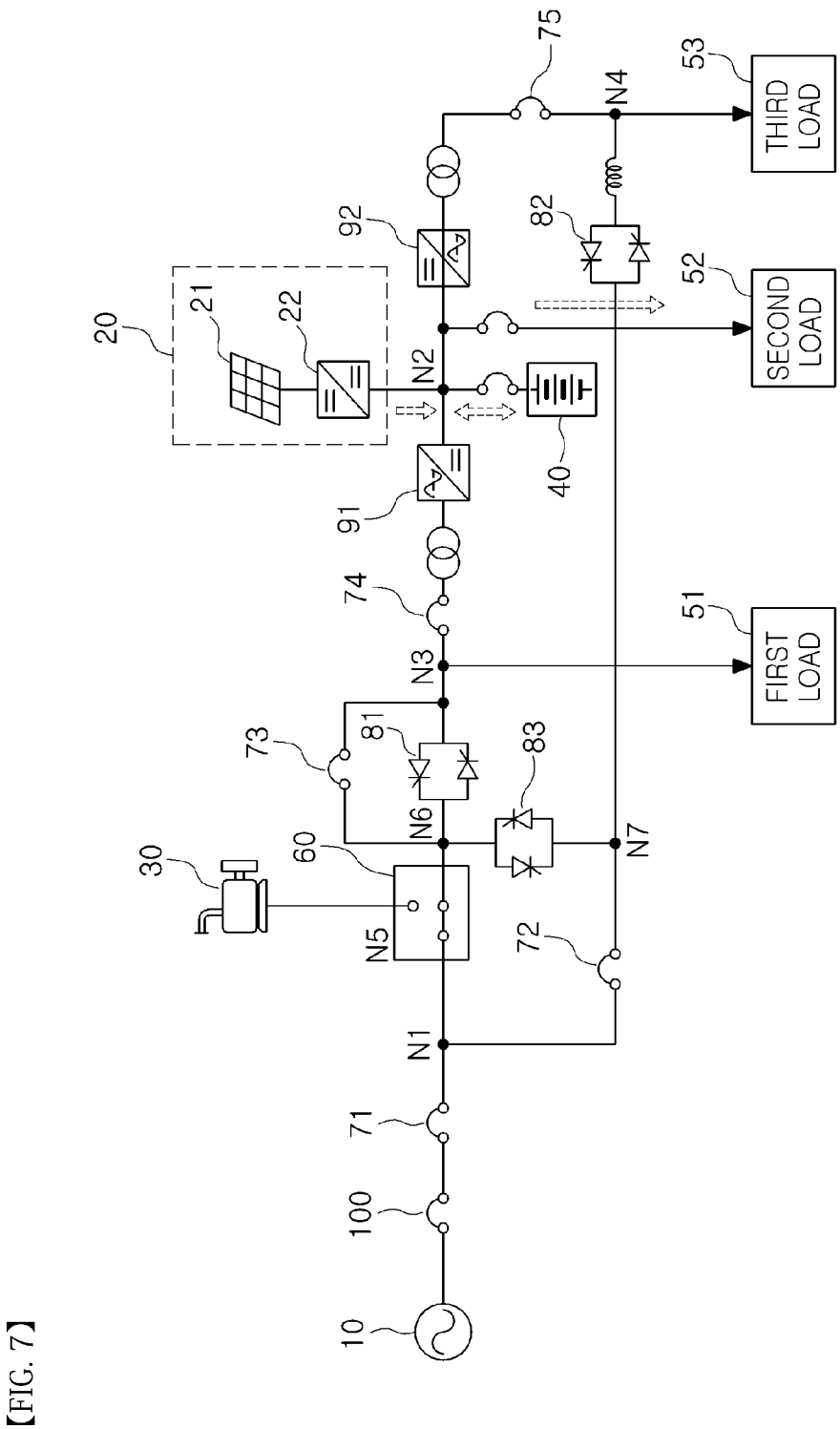
[FIG. 7]

MICRO-GRID SYSTEM WITH UN-INTERRUPTIBLE POWER SUPPLY

CROSS-REFERENCE OF RELATED APPLICATIONS

This application is the U.S. National Phase under 35 U.S.C. § 371 of International Patent Application No. PCT/KR2019/017513, filed on Dec. 11, 2019, which in turn claims the benefit of Korean Application No. 10-2018-0160678, filed on Dec. 13, 2018, the entire disclosures of which applications are incorporated by reference herein.

TECHNICAL FIELD

The present application relates to a system capable of supplying power without interruption even if an abnormality occurs in a power system in some configurations.

BACKGROUND ART

As a system supplying power, microgrids, and the like, are used. A microgrid is composed of various power generation facilities or energy storage devices, or the like, centered on an AC grid such as a bus system, or the like, and can be implemented by disposing various types of power converters in positions in which a single power control is required.

(Patent Document) Korean Patent Registration No. 10-1277185

DISCLOSURE

Technical Problem

According to an embodiment of the present disclosure, provided is a microgrid system with a power supply capable of supplying power without interruption even if an abnormality occurs in some components in a power system.

Technical Solution

According to an embodiment of the present disclosure, a microgrid system with a power supply includes: a first node having AC power from a bus system applied thereto; a first generator for applying DC power to a second node; a first load connected to a third node and receiving AC power therefrom; a second load connected to the second node and receiving DC power therefrom; a third load connected to a fourth node and receiving AC power therefrom; a first converter converting the DC power of the second node into AC power and outputting the same; a second converter converting the DC power of the second node into AC power and outputting the same; and a switch unit adjusting a connection relationship between the first node, the third node, the fourth node, the first converter, and the second converter, according to statuses of the first converter and the second converter.

When AC power is applied to the first node from the bus system and the first converter is normal, the switch unit of the microgrid system with a power supply according to an embodiment of the present disclosure may connect the first node to the fourth node, and connect the first node to the third node.

When AC power is not applied to the first node from the bus system and the first converter and the second converter are normal, the switch unit of the microgrid system with a power supply according to an embodiment of the present disclosure may adjust the connection relationship so that the AC power output from the first converter is applied to the third node, and the AC power output from the second converter is applied to the fourth node.

When AC power is not applied to the first node from the bus system, the first converter does not operate, and the second converter is normal, the switch unit of the microgrid system with a power supply according to an embodiment of the present disclosure may adjust the connection relationship so that the AC power output from the second converter is applied to the fourth node, and the fourth node and the third node are connected.

The microgrid system with a power supply according to an embodiment of the present disclosure may further include a second generator applying AC power to a fifth node.

When AC power is not applied to the first node from the bus system, the switch unit of the microgrid system with a power supply according to an embodiment of the present disclosure may connect the fifth node to the third node. In this case, the switch unit may connect the fifth node to the fourth node, when the second converter does not operate.

A power supply system according to another embodiment of the present disclosure includes: a first node having AC power from a bus system applied thereto; a second node having DC power from a first generator applied thereto; a third node having AC power applied thereto, and connected to a second load; a fourth node having AC power applied thereto, and connected to a third load; a first converter converting the DC power of the second node into AC power and outputting the same; a second converter converting the DC power of the second node into AC power and outputting the same; a fifth node having AC power from a second generator applied thereto; a first switch selectively connecting the first node or the fifth node to the sixth node; a second switch connected between the first node and a seventh node; a third switch connected between the sixth node and the seventh node; a fourth switch connected between the sixth node and the third node; a fifth switch connected between the third node and the first converter; a sixth switch connected between the second converter and the fourth node; and a seventh switch connected between the seventh node and the fourth node.

The first switch of the power supply system according to another embodiment of the present disclosure may be an automatic transfer switch, the second switch, the fifth switch, and the sixth switch may be switches having a mechanical contact, and the third switch and the seventh switch may be switches having an electronic contact.

The power supply system according to another embodiment of the present disclosure may further include an eighth switch connected to the fourth switch in parallel, the fourth switch may be a switch having an electronic contact, and the eighth switch may be a switch having a mechanical contact.

The power supply system according to another embodiment of the present disclosure may further include a ninth switch connected between the bus system and the first node.

In the power supply system according to another embodiment of the present disclosure, when AC power is applied to the first node from the bus system and the first converter and the second converter are normal, the first switch may connect the first node to the sixth node, the second switch, the fourth switch, the fifth switch, and the seventh switch may be turned-on, and the third switch and the sixth switch may be turned-off.

In the power supply system according to another embodiment of the present disclosure, when AC power is not applied to the first node from the bus system and the first converter and the second converter are normal, the first switch may connect the fifth node to the sixth node, the fourth switch, the fifth switch, and the sixth switch may be turned-on, and the second switch, the third switch, and the seventh switch may be turned-off.

In the power supply system according to another embodiment of the present disclosure, when AC power is not applied to the first node from the bus system, the first converter is normal, and the second converter does not operate, the first switch may connect the fifth node to the sixth node, the third switch, the fourth switch, the fifth switch, and the seventh switch may be turned-on, and the second switch and the sixth switch may be turned-off.

In the power supply system according to another embodiment of the present disclosure, when AC power is not applied to the first node from the bus system, the second converter is normal, and the first converter does not operate, the first switch may connect the fifth node to the sixth node, the third switch, the fourth switch, the sixth switch, and the seventh switch may be turned-on, and the second switch and the fifth switch may be turned-off.

In the power supply system according to another embodiment of the present disclosure, when AC power is not applied to the first node from the bus system and the first converter and the second converter do not operate, the first switch may connect the fifth node to the sixth node, the third switch, the fourth switch, and the seventh switch may be turned-on, and the second switch, the fifth switch, and the sixth switch may be turned-off.

In the power supply system according to another embodiment of the present disclosure, the first converter may be a bidirectional converter further performing a function of converting AC power of a third node into DC power and outputting the same, and the second converter may be an inverter.

Advantageous Effects

Accordingly, according to the microgrid system with a power supply according to an embodiment of the present disclosure, even if an abnormality occurs in the power system or an abnormality occurs in some components constituting the system, power can be supplied without interruption.

In addition, the microgrid system with a power supply of the present disclosure enables seamless power supply without redundant power systems or converters, thereby reducing investment costs.

DESCRIPTION OF DRAWINGS

FIG. 1 is a schematic diagram of a microgrid system with a power supply according to an embodiment of the present disclosure.

FIG. 2 is a diagram illustrating an energy flow when no abnormality occurs in the microgrid system in a power supply according to the embodiment of the present disclosure shown in FIG. 1.

FIG. 3 is a diagram illustrating an energy flow when an abnormality occurs in a bus system in the microgrid system in a power supply according to the embodiment of the present disclosure shown in FIG. 1.

FIG. 4 is a diagram illustrating an energy flow when an abnormality occurs in a bus system and an inverter in the microgrid system in a power supply according to the embodiment of the present disclosure shown in FIG. 1.

FIG. 5 is a diagram illustrating an energy flow when an abnormality occurs in a bus system and a converter in the microgrid system in a power supply according to the embodiment of the present disclosure shown in FIG. 1.

FIG. 6 is a diagram illustrating an energy flow when an abnormality occurs in a bus system, a converter, and an inverter in the microgrid system in a power supply according to the embodiment of the present disclosure shown in FIG. 1.

FIG. 7 is a diagram illustrating an energy flow when an abnormality occurs in a bus system, an emergency generator, a converter, and an inverter in the microgrid system in a power supply according to the embodiment of the present disclosure shown in FIG. 1.

BEST MODE FOR INVENTION

Hereinafter, embodiments of the present disclosure will be described in detail. It should be noted that the following examples are intended to illustrate preferred embodiments of the invention and are not intended to limit the scope of the disclosure. The scope of the present disclosure is determined by the matters described in the claims and able to be reasonably inferred therefrom.

FIG. 1 is a schematic diagram of a microgrid system with a power supply according to an embodiment of the present disclosure. According to an embodiment of the present disclosure, a microgrid system with a power supply may include a bus system 10, a first generator 20, a second generator 30, an energy storage device 40, a first load 51, a second load 52, a third load 53, a switch unit composed of a plurality of switches 60, 71, 72, 73, 74, 75, 76, 77, 81, 83, and 100, a converter 91, and an inverter 92.

The bus system 10 may supply alternating current (AC) power to a first node N1. The bus system 10 may be a system transmitting power to the first node N1 from an external power plant or the like.

The first generator 20 may supply direct current (DC) power to a second node N2. The first generator 20 may be a generator of various types, such as a solar generator, or the like. When the first generator 20 is a solar generator, the first generator 20 may include a solar generation facility 21 such as a solar cell generating power from incident sunlight, and a converter 22 converting the power generated by the solar generation facility 21 into direct power having a constant voltage or a constant current. In this case, the converter 22 may be a DC/DC converter.

The second generator 30 may supply AC power to a fifth node N5. The second generator 30 may be a diesel engine generator, and may function as an emergency generator when power is not supplied from the bus system 10.

The energy storage device 40 may store energy using power supplied to the second node N2, or may supply the stored energy to the second node N2. The energy storage device 40 may comprise a rechargeable battery or the like.

The first load 51 may be connected to a third node N3, and may receive AC power through the third node N3. The first load 51 may have an incomplete uninterruptible characteristic. That is, in some cases, AC power may not be supplied to the first load 51. The first load 51 may receive at least one of AC power supplied to the first node N1 from the bus system 10, AC power converted from the DC power supplied to the second node N2 by the second generator 20, AC power converted from the DC power supplied to the second node N2 by the energy storage device 40, and AC power supplied to the fifth node N5 by the second generator 30 through a switch unit.

The second load 52 may be connected to a second node N2, and may receive DC power through the second node N2. The second load 52 may have a complete uninterruptible characteristic. That is, the second load 52 may be implemented such that DC power is always supplied to the second load 52 in any situation except for overcurrent blocking. The second load 52 may receive at least one of DC power supplied to the second node N2 by the second generator 20 and DC power supplied to the second node N2 by the energy storage device 40 through a switch unit. In some cases, the second load 52 may receive at least one of DC power converted from the AC power supplied to the first node N1 from the bus system 10 and DC power converted from the AC power supplied to the fifth node N5 by the second generator 30 through a switch unit.

The third load 53 may be connected to a fourth node N4, and may receive AC power through the fourth node N4. The third load 53 may have a relatively more complete uninterruptible characteristic than the first load 51. That is, unless there is an exceptional case, AC power may be supplied to the third load 53. The third load 53 may receive at least one of AC power supplied from the bus system 10 to the first node N1, AC power converted from the DC power supplied to the second node N2 by the second generator 20, AC power converted from the DC power supplied to the second node N2 by the second generator 30, AC power converted from the DC power supplied to the second node N2 by the energy storage device 40, and AC power supplied to the fifth node N5 by the second generator 30 through a switch unit.

The converter 91 may convert the DC power of the second node N2 into AC power and transmit the converted DC power to the third node N3. The AC power output from the converter 91 may be adjusted to have the same phase as the AC power supplied from the bus system 10 and applied to the third node N3, or AC power generated by the second generator 30 and applied to the third node N3. Alternatively, the converter 91 may convert AC power of the third node N2 into DC power and transmit the same to the second node N2. That is, the converter 91 may be a bidirectional converter.

The inverter 92 may convert DC power of the second node N2 into AC power and transmit the same to the fourth node N4. The inverter 92 may be a constant voltage constant frequency (CVCF) inverter.

The switch unit may form different power transmission paths according to statuses of the bus system 10, the second generator 30, the converter 91, and the inverter 92.

The switch unit may include a switch 60 connecting the first node N1 or the fifth node N5 to the sixth node N6, a switch 73 connected between the sixth node N6 and the third node N3, a switch 81 connected between the sixth node N6 and the third node N3, a switch 83 connected between the sixth node N6 and the seventh node N7, a switch 72 connected between the first node N1 and the seventh node N7, a switch 82 connected between the seventh node N7 and the fourth node N4, a switch 74 connected between the third node N3 and the converter 91, and a switch 75 connected between the inverter 92 and the fourth node N4.

The switch unit may further include at least one of switches 71 and 100 connected between the bus system 10 and the first node N1, a switch 76 connected between the second node N2 and the energy storage device 40, and a switch 77 connected between the second node N2 and the second load 52. The switches 76 and 77 can remain on unless there is a special case (e.g., when overcurrent blocking is required). In addition, the switches 71 and 100 may be kept on unless an abnormality occurs in the bus system 10.

The switch 60 may be an automatic transfer switch (ATS), and the switches 71, 72, 73, 74, 75, 76, and 77 may be switches having a physical contact such as molded case circuit breaker (MCCB), and the switches 81, 82, and 83 may be switches having an electronic contact point such as a static transfer switch (STS). The switch 100 may be an air circuit breaker (ACB).

An operation of each of the switches of the switch unit will be described with reference to FIGS. 2 to 7. In addition, the microgrid system with a power supply of the present disclosure may additionally include an inductor connected to the switch 82 in series. In addition, although not shown, the microgrid system with a power supply according to an embodiment of the present disclosure may recognize a state of the bus system 10, the second generator 30, the converter 91, and the inverter 92, and may also further include a control unit controlling the switches of the switch unit.

FIG. 2 is a diagram illustrating an energy flow when an abnormality does not occur in the microgrid system with a power supply according to an embodiment of the present disclosure shown in FIG. 1.

When all of a bus system 10, a converter 91, and an inverter 92 operate normally, a second generator 30 may not operate. In addition, in this case, AC power supplied from the bus system 10 is applied. To this end, switches 100 and 71 may be turned-on.

In addition, AC power applied to the first node N1 may be supplied to a third load 52. To this end, switches 72 and 82 may be turned-on, and a switch 75 may be turned-off. In addition, the inverter 92 may not operate.

At least one of AC power applied to the first node N1 and DC power converted by the converter 91 may be supplied to a first load 51. To this end, the switch 60 may connect the first node N1 and the sixth node N6, and at least one of the switches 73 and 81 and a switch 74 may be turned-on, and the switch 74 may be turned-on. In addition, the switch 83 can be turned-off.

In addition, in this case, DC power applied to a second node N2 may be supplied to the second load 52. To this end, the switch 77 may be turned-on. In addition, the converter 91 may also convert AC power applied to the third node N3 into DC power and output the same to the second node N2.

FIG. 3 is a diagram illustrating an energy flow when an abnormality occurs in a bus system in the microgrid system with a power supply according to an embodiment of the present disclosure shown in FIG. 1.

When an abnormality occurs in a bus system 10 and AC power is not applied to a first node N1, a second generator 30 may operate.

In addition, when an abnormality occurs in the bus system 10, and the second generator 30, a converter 91, and an inverter 92 operate, a third load 53 receives AC power output from the inverter 92. To this end, when an abnormality occurs in the bus system 10, the inverter 92 immediately operates, and a switch 75 may be turned-on. Accordingly, even if an abnormality occurs in the bus system 10, AC power may be supplied to a third load 53 within a short time (e.g., 4 msec) from the time at which the abnormality occurs in the bus system 10. That is, a power failure time of the third load 53 may be very short. In this case, switches 72, 82, and 83 may be turned-off.

In addition, in this case, the first load 51 may receive AC power generated by the second generator 30. To this end, a switch 60 may connect a fifth node N5 and a sixth node N6, and at least one of the switches 73 and 81 may be turned-on. The switch 83 can be turned-off. The first load 51 may receive AC power output from the converter 91. To this end, the converter 91 may convert DC power of the second node N2 into AC power and output the same, and the switch 74 may be turned-on. Accordingly, AC power may be supplied to the first load 51 within a certain time (e.g., 100 msec) from the time at which an abnormality occurs in the bus system 10.

In addition, in this case, the AC power output from the converter 91 may be adjusted to have the same phase as the AC power generated by the second generator 30 and applied to the third node N3. As a result, the second generator 30 and the converter 91 may be converted to a parallel operation mode, and thus power can be more stably supplied to the first load 51.

Also, in this case, DC power applied to the second node N2 may be supplied to the second load 52. To this end, a switch 77 may be turned-on. Also, the converter 91 may convert AC power applied to the third node N3 into DC power and output the same to the second node N2.

FIG. 4 is a diagram illustrating an energy flow when an abnormality occurs in a bus system and an inverter in the microgrid system with a power supply according to the embodiment of the present disclosure shown in FIG. 1.

When an abnormality occurs in a bus system 10 and AC power is not applied to a first node N1, a second generator 30 may operate. Also, a switch 60 may connect a fifth node N5 to a sixth node N6.

In addition, when an abnormality occurs in the bus system 10 and an inverter 92, and the second generator 30 and the converter 91 operate normally, a third load 53 may receive AC power generated by the second generator 30. To this end, switches 83 and 82 may be turned-on. A switch 75 can be turned-off. Also, the third load 53 may also receive AC power output from the converter 91. To this end, the converter 91 may convert DC power of the second node N2 into AC power and output the same, and the switch 74 may be turned-on.

In addition, in this case, a first load 51 may receive AC power generated by the second generator 30. To this end, the switch 60 may connect the fifth node N5 and the sixth node N6, and at least one of the switches 73 and 81 may be turned-on. The switch 83 can be turned-off. The first load 51 may also receive AC power output from the converter 91. To this end, the converter 91 may convert DC power of the second node N2 into AC power and output the same, and the switch 74 may be turned-on. Accordingly, AC power may be supplied to the first load 51 within a certain time (e.g., 100 msec) from the time at which an abnormality occurs in the bus system 10.

Also, in this case, DC power applied to the second node N2 may be supplied to the second load 52. To this end, the switch 77 may be turned-on. Also, the converter 91 may convert AC power applied to the third node N3 into DC power and output the same to the second node N2.

That is, in the case of FIG. 4, the second generator 30 and the converter 91 may operate in a parallel operation mode. Accordingly, power may be more stably supplied to the first load 51 and the third load 53.

FIG. 5 is a diagram illustrating an energy flow when an abnormality occurs in a bus system and a converter in the microgrid system with a power supply according to the embodiment of the present disclosure shown in FIG. 1.

When an abnormality occurs in a bus system 10 and AC power is not applied to a first node N1, a second generator 30 may operate. Also, a switch 60 may connect a fifth node N5 to a sixth node N6.

When an abnormality occurs in the bus system 10 and the converter 91, and the second generator 30 and the inverter 92 operate, a third load 53 may receive AC power output from the inverter 92. To this end, a switch 75 may be turned-on, and a switch 72 may be turned-off.

In addition, in this case, a first load 51 may receive AC power generated by the second generator 30. To this end, the switch 60 may connect the fifth node N5 to the sixth node N6, and at least one of the switches 73 and 81 may be turned-on. The switch 74 can be turned-off. The first load 51 may receive AC power output from the inverter 92. To this end, the switches 75, 82, and 83 may be turned-on. In addition, in this case, the AC power output from the inverter 92 may be adjusted to have the same phase as the AC power generated by the second generator 30 and applied to the third node N3. That is, since the second generator 30 and the inverter 92 operate in a parallel operation mode, power can be more stably supplied to the first load 51.

Also, in this case, DC power applied to the second node N2 may be supplied to the second load 52. To this end, the switch 77 may be turned-on.

FIG. 6 is a diagram illustrating an energy flow when an abnormality occurs in a bus system, a converter, and an inverter in the microgrid system with a power supply according to an embodiment of the present disclosure shown in FIG. 1.

When an abnormality occurs in the bus system 10 and AC power is not applied to the first node N1, the second generator 30 may operate. Also, the switch 60 may connect the fifth node N5 to the sixth node N6.

In addition, when an abnormality occurs in the bus system 10, the converter 91, and the inverter 92, and the second generator 30 operates normally, the third load 53 receives AC power generated by the second generator 30. To this end, the switches 83 and 82 may be turned-on. The switch 75 may be turned-off.

Also, in this case, the first load 51 may receive AC power generated by the second generator 30. To this end, the switch 60 may connect the fifth node N5 and the sixth node N6, and at least one of the switches 73 and 81 may be turned-on. The switch 74 can be turned-off.

Also, in this case, DC power applied to the second node N2 may be supplied to the second load 52. To this end, the switch 77 may be turned-on.

FIG. 7 is a diagram illustrating an energy flow when abnormality occurs in a bus system, an emergency generator, a converter, and an inverter in the microgrid system with a power supply according to an embodiment of the present invention shown in FIG. 1.

When an abnormality occurs in the bus system 10, the emergency generator 30, the converter 91, and the inverter 92, DC power applied to the second node N2 may be supplied to the second load 52. To this end, the switch 77 may be turned-on.

Also, in this case, power may not be supplied to the first load 51 and the third load 53.

While the example embodiments have been illustrated and described above, it will be apparent to those skilled in the art that modifications and variations could be made without departing from the scope of the present disclosure as defined by the appended claims.

The invention claimed is:
1. A microgrid system with a power supply, comprising:
a first node having AC power from a bus system applied thereto;
a first generator for applying DC power to a second node;
a first load connected to a third node and receiving the AC power therefrom;

a second load connected to the second node and receiving DC power therefrom;
a third load connected to a fourth node and receiving AC power therefrom;
a first converter converting the DC power of the second node into AC power, and outputting the same;
a second converter converting the DC power of the second node into AC power, and outputting the same;
a switch unit adjusting a connection relationship between the first node, the third node, the fourth node, the first converter, and the second converter, according to statuses of the first converter and the second converter; and
a second generator for applying AC power to a fifth node,
wherein when AC power is not applied to the first node from the bus system, the switch unit connects the fifth node to the third node, and
wherein when AC power is not applied from the bus system to the first node, the fifth node and the third node are connected to supply AC power from the second generator and AC power from the first converter to the first load, and a phase of AC power from the first converter is adjusted to be the same as that of the second generator.

2. The microgrid system with a power supply of claim 1, wherein when AC power is applied to the first node from the bus system and the first converter is normal, the switch unit connects the first node to the fourth node, and connects the first node to the third node.

3. The microgrid system with a power supply of claim 2, wherein the switch unit adjusts the connection relationship so that the AC power output from the first converter is applied to the third node.

4. The microgrid system with a power supply of claim 1, wherein when AC power is not applied to the first node from the bus system and the first converter and the second converter are normal, the switch unit adjusts the connection relationship so that the AC power output from the first converter is applied to the third node, and the AC power output from the second converter is applied to the fourth node.

5. The microgrid system with a power supply of claim 1, wherein when AC power is not applied to the first node from the bus system, the first converter does not operate, and the second converter is normal, the switch unit adjusts the connection relationship so that the AC power output from the second converter is applied to the fourth node, and the fourth node and the third node are connected.

6. The microgrid system with a power supply of claim 1, wherein when AC power is not applied from the bus system to the first node, the fifth node and the third node are connected to supply AC power from the second generator and AC power from the first converter to the first load, such that the second generator and the first converter are converted to a parallel operation mode.

7. A microgrid system with a power supply, comprising:
a first node having AC power from a bus system applied thereto;
a first generator for applying DC power to a second node;
a first load connected to a third node and receiving the AC power therefrom;
a second load connected to the second node and receiving DC power therefrom;
a third load connected to a fourth node and receiving AC power therefrom;
a first converter converting the DC power of the second node into AC power, and outputting the same;
a second converter converting the DC power of the second node into AC power, and outputting the same;
a switch unit adjusting a connection relationship between the first node, the third node, the fourth node, the first converter, and the second converter, according to statuses of the first converter and the second converter; and
a second generator for applying AC power to a fifth node,
wherein when AC power is not applied to the first node from the bus system, the switch unit connects the fifth node to the third node, and
wherein when the second converter does not operate, the switch unit connects the fifth node to the fourth node.

8. A microgrid system with a power supply, comprising:
a first node having AC power from a bus system applied thereto;
a second node having DC power from a first generator applied thereto, and connected to a first load;
a third node having AC power applied thereto, and connected to a second load;
a fourth node having AC power applied thereto, and connected to a third load;
a first converter converting the DC power of the second node into AC power and outputting the same;
a second converter converting the DC power of the second node into AC power and outputting the same;
a fifth node having AC power from a second generator applied thereto;
a first switch selectively connecting the first node or the fifth node to a sixth node;
a second switch connected between the first node and a seventh node;
a third switch connected between the sixth node and the seventh node;
a fourth switch connected between the sixth node and the third node;
a fifth switch connected between the third node and the first converter;
a sixth switch connected between the second converter and the fourth node; and
a seventh switch connected between the seventh node and the fourth node.

9. The microgrid system with a power supply of claim 8, wherein the first switch is an automatic transfer switch,
the second switch, the fifth switch, and the sixth switch are switches having a mechanical contact, and
the third switch and the seventh switch are switches having an electronic contact.

10. The microgrid system with a power supply of claim 8, wherein the microgrid system with a power supply further comprises an eighth switch connected to the fourth switch connected in parallel,
wherein the fourth switch is a switch having an electronic contact, and the eighth switch is a switch having a mechanical contact.

11. The microgrid system with a power supply of claim 8, wherein the microgrid system with a power supply further comprises a ninth switch connected between the bus system and the first node.

12. The microgrid system with a power supply of claim 8, wherein when AC power is applied to the first node from the bus system and the first converter and the second converter are normal, the first switch connects the first node and the sixth node, and the second switch, the fourth switch, the fifth switch, and the seventh switch are turned-on, and the third switch and the sixth switch are turned-off.

13. The microgrid system with a power supply of claim 8, wherein when AC power is not applied to the first node from the bus system and the first converter and the second converter are normal, the first switch connects the fifth node and the sixth node, and the fourth switch, the fifth switch, and the sixth switch are turned-on, and the second switch, the third switch, and the seventh switch are turned-off.

14. The microgrid system with a power supply of claim 8, wherein when AC power is not applied to the first node from the bus system, the first converter is normal, and the second converter does not operate, the first switch connects the fifth node to the sixth node, the third switch, the fourth switch, the fifth switch, and the seventh switch are turned-on, and the second switch and the sixth switch are turned-off.

15. The microgrid system with a power supply of claim 8, wherein when AC power is not applied to the first node from the bus system, the second converter is normal, and the first converter does not operate, the first switch connects the fifth node to the sixth node, the third switch, the fourth switch, the sixth switch, and the seventh switch are turned-on, and the second switch and the fifth switch are turned-off.

16. The microgrid system with a power supply of claim 8, wherein when AC power is not applied to the first node from the bus system, and the first converter and the second converter do not operate, the first switch connects the fifth node to the sixth node, the third switch, the fourth switch, and the seventh switch are turned-on, and the second switch, the fifth switch, and the sixth switch are turned-off.

17. The microgrid system with a power supply of claim 8, wherein the first converter is a bidirectional converter further performing a function of converting AC power of a third node into DC power and outputting the same, wherein the second converter is an inverter.

\* \* \* \* \*